United States Patent
Wiegele et al.

(10) Patent No.: US 10,333,197 B2
(45) Date of Patent: Jun. 25, 2019

(54) WIRELESS NETWORK WITH EQUIPMENT AREA NETWORK

(71) Applicant: Simmonds Precision Products, Inc., Vergennes, VT (US)

(72) Inventors: Thomas G. Wiegele, Eagan, MN (US); Radoslaw Zakrzewski, South Burlington, VT (US); Michael A. Lynch, Shelburne, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 15/720,918

(22) Filed: Sep. 29, 2017

(65) Prior Publication Data
US 2019/0103654 A1 Apr. 4, 2019

(51) Int. Cl.
| | |
|---|---|
| *H04L 12/70* | (2013.01) |
| *H04L 12/24* | (2006.01) |
| *H04L 12/28* | (2006.01) |
| *H01Q 1/22* | (2006.01) |
| *H04W 88/18* | (2009.01) |
| *H04W 88/10* | (2009.01) |

(52) U.S. Cl.
CPC .......... *H01Q 1/2291* (2013.01); *H04W 88/10* (2013.01); *H04W 88/182* (2013.01)

(58) Field of Classification Search
CPC . H04B 7/18508; B64D 11/0007; H04L 12/70; H04L 12/24; H04L 12/28; H04L 29/12009; H04L 12/2803; H04L 5/1453
USPC .................. 455/41.1, 456.1, 48.4; 348/143; 370/392, 390, 312
See application file for complete search history.

(56) References Cited

U.S. PATENT DOCUMENTS

| | | | |
|---|---|---|---|
| 6,779,127 B1 * | 8/2004 | Lee | H04L 29/12009 709/224 |
| 8,023,443 B2 | 9/2011 | Zakrzewski | |
| 8,344,912 B2 | 1/2013 | Mitchell et al. | |
| 8,374,601 B2 | 2/2013 | Sadok et al. | |

(Continued)

FOREIGN PATENT DOCUMENTS

| | | |
|---|---|---|
| EP | 3067984 A1 | 9/2016 |
| EP | 3248885 A1 | 11/2017 |

OTHER PUBLICATIONS

Extended European Search Report for EP Application No. 18197176. 3, dated Feb. 12, 2019, pp. 10.

*Primary Examiner* — William D Cumming
(74) *Attorney, Agent, or Firm* — Kinney & Lange, P.A.

(57) ABSTRACT

A multi-level network system of an aircraft includes at least one equipment area network and a wide area network. The equipment area network includes equipment of the aircraft, at least one wireless device, and at least one equipment area network coordinator. The at least one wireless device is configured to transmit and receive data using a first wireless link. The at least one equipment area network coordinator is configured to transmit to and receive data from the at least one wireless device using the first wireless link and to transmit data to and receive data from the wide area network using a second wireless link, the first wireless link using lower power than the second wireless link. The wide area network includes a wide area network coordinator that is configured to transmit and receive data from the at least one equipment area network coordinator using the second wireless link.

17 Claims, 3 Drawing Sheets

(56) References Cited

U.S. PATENT DOCUMENTS

| | | | |
|---|---|---|---|
| 8,385,339 B1* | 2/2013 | Ibrahim | B64D 11/0015 370/390 |
| 8,787,904 B1 | 7/2014 | Hayes et al. | |
| 9,122,531 B2* | 9/2015 | Duarte | H04L 41/0803 |
| 9,232,345 B1 | 1/2016 | Rencher et al. | |
| 9,304,822 B2* | 4/2016 | Duarte | H04L 41/0803 |
| 9,497,075 B2* | 11/2016 | DeCusatis | H04L 12/44 |
| 9,794,126 B2* | 10/2017 | Gang | H04L 41/0826 |
| 2003/0163232 A1* | 8/2003 | Moretto | G05D 1/0061 701/3 |
| 2004/0048570 A1* | 3/2004 | Oba | G06F 1/1626 455/41.1 |
| 2004/0111496 A1* | 6/2004 | Han | H04L 12/2803 709/220 |
| 2006/0023262 A1* | 2/2006 | Denpo | H04N 1/00408 358/400 |
| 2006/0064325 A1* | 3/2006 | Matsumoto | A61B 5/1118 705/3 |
| 2009/0096857 A1* | 4/2009 | Frisco | H04B 7/18508 348/14.02 |
| 2010/0190510 A1* | 7/2010 | Maranhas | G06Q 10/02 455/456.1 |
| 2012/0174165 A1* | 7/2012 | Mondragon | H04N 21/2146 725/75 |
| 2013/0259050 A1* | 10/2013 | Eastlake, III | H04L 45/74 370/392 |
| 2013/0342326 A1* | 12/2013 | Wang | H04Q 9/00 340/10.1 |
| 2014/0053185 A1* | 2/2014 | Bleacher | H04N 21/41422 725/26 |
| 2015/0070492 A1* | 3/2015 | Hozumi | B64D 11/0007 348/143 |
| 2015/0131512 A1* | 5/2015 | Lauer | H04L 5/1453 370/312 |
| 2015/0172100 A1* | 6/2015 | DeCusatis | H04L 12/44 370/228 |
| 2015/0172172 A1* | 6/2015 | DeCusatis | H04L 12/44 370/219 |
| 2016/0003708 A1 | 1/2016 | D'Orlando et al. | |
| 2017/0134234 A1* | 5/2017 | Gang | H04L 41/0826 |

* cited by examiner

WIRELESS NETWORK WITH EQUIPMENT AREA NETWORK

BACKGROUND

In one example, equipment area network 12 is completely contained within an electromagnetically shielded enclosure. The electromagnetically shielded enclosure substantially attenuates wireless signals between equipment area network 12 and wide area network 11. To facilitate communication between equipment area network coordinator 20 and wireless area network coordinator 16 a first antenna of equipment area network coordinator 20 is located inside of the electromagnetically shielded enclosure. A second antenna of equipment area network coordinator 20 is located outside the electromagnetically shielded enclosure.

SUMMARY

In one example, an equipment area network system of an aircraft comprises equipment of the aircraft, at least one wireless device proximate to the equipment, and at least one equipment area network coordinator. The wireless device is configured to transmit and receive data over a first wireless link. The at least one equipment area network coordinator is communicatively coupled to the at least one wireless device via the first wireless link. The equipment area network coordinator comprises a first transceiver and a second transceiver. The first transceiver is communicatively coupled to the at least one wireless device. The first transceiver is configured to transmit and receive data using the first wireless link. The second transceiver is configured to transmit and receive data outside of the equipment area network using a second wireless link. The first wireless link uses lower power than the second wireless link.

In one example, a multi-level network system of an aircraft comprises at least one equipment area network and a wide area network. The at least one equipment area network comprises equipment of the aircraft, at least one wireless device proximate to the equipment, and at least one equipment area network coordinator. The wireless device is configured to transmit and receive data over a first wireless link. The at least one equipment area network coordinator is configured to transmit to and receive data from the at least one wireless device using a first wireless link and to transmit and receive data using a second wireless link. The first wireless link uses lower power than the second wireless link. The wide area network includes a wide area network coordinator configured to transmit and receive data from the at least one equipment area network coordinator using the second wireless link.

In one example, a method comprises receiving, using a first transceiver, data from at least one wireless device of an aircraft, the data received via a first wireless link using a first wireless protocol; translating, using a controller, the data from the first wireless protocol to a second wireless protocol in response to the receiving the data; and transmitting, using a second transceiver, the data over a second wireless link using the second wireless protocol in response to the sensor data being translated from the first wireless protocol to the second wireless protocol, the second wireless link using higher power than the first wireless link.

DETAILED DESCRIPTION

Apparatus, systems, and associated methods relate to wide area networks that include equipment area networks. In some applications, such as an aircraft, wireless devices are used to monitor and/or control various regions and equipment of the aircraft. These wireless devices are often battery or energy harvester powered, thus low power wireless equipment and protocols are beneficial. At the same time, wireless devices are often placed in remote and sometimes even electromagnetically shielded locations. These locations benefit from higher power wireless protocols and equipment, which consume more power and cost more. Using the apparatus, systems, and associated methods herein, allows for wireless devices to use low power wireless protocols and equipment to transmit to and receive data from equipment area network coordinators, which can then transmit to and receive data from wide area network coordinators using higher power protocols and equipment.

Figure 1:
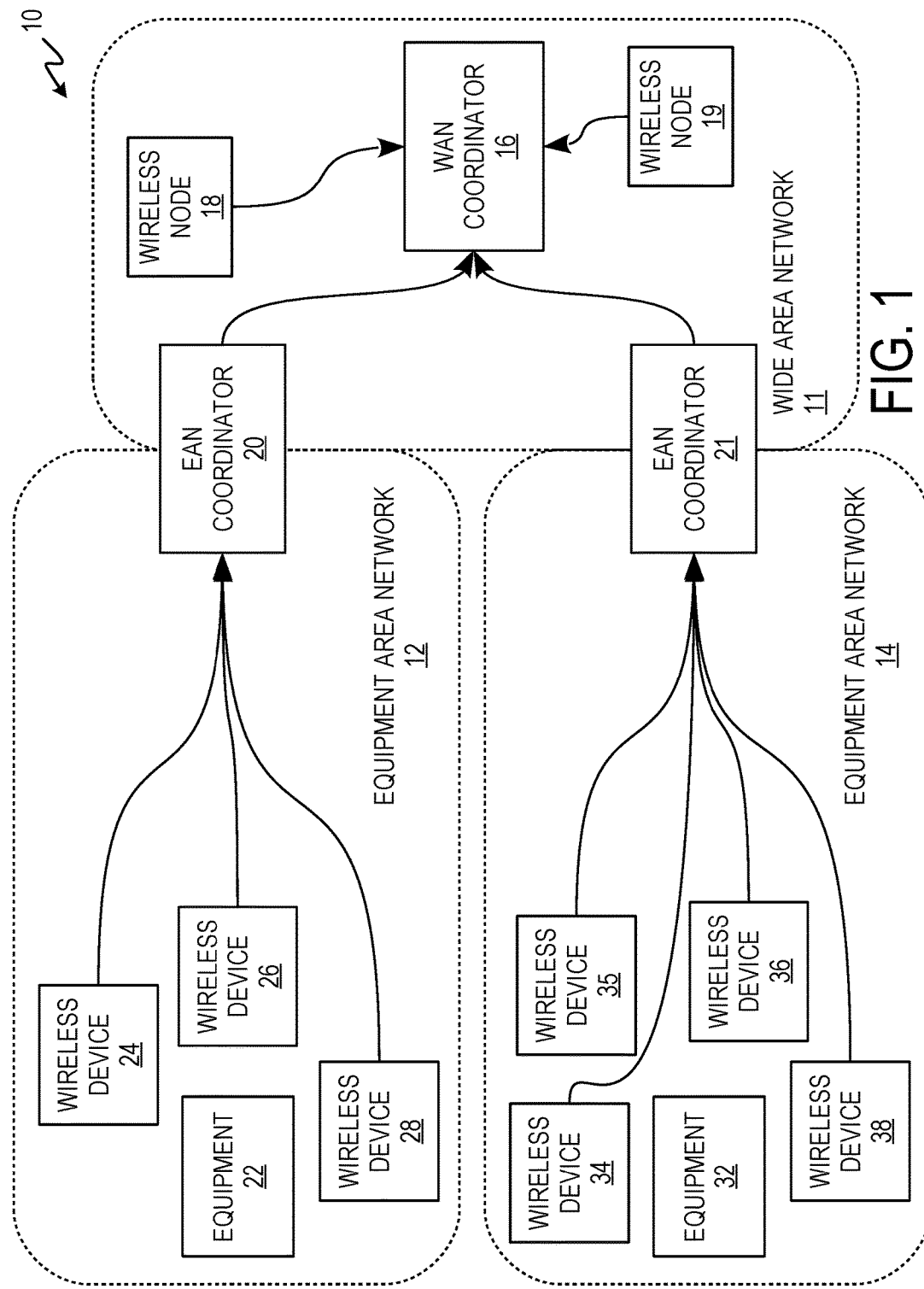
FIG. 1 is a block diagram of a multi-level wireless network including equipment area networks.

FIG. 1 is a block diagram of multi-level wireless network 10 including wide area network 11 and equipment area networks 12 and 14. Wide area network includes wide area network (WAN) coordinator 16, wireless nodes 18 and 19, and equipment area network (EAN) coordinators 20 and 21. Equipment area network 12 includes equipment area network coordinator 20; equipment 22; and wireless devices 24, 26, and 28. Equipment area network 14 includes equipment area network coordinator 21; equipment 32; and wireless devices 34, 35, 36, and 38.

Wireless devices 24, 26, and 28 are located proximate to equipment 22. Equipment 22 can be a fuel tank, a wheel assembly, air cycle machine, rotor, or other equipment that is monitored and/or controlled using wireless devices. Wireless devices 24, 26, and 28 can be wireless sensors and/or wireless controllers. Wireless devices 24, 26, and 28 can be configured to sense one or more parameters such as temperature, fuel level, vibration, pressure, or other parameters of equipment 22. Wireless devices 24, 26, and 28 are configured to communicate with equipment area network 20 using a wireless link. Wireless devices 24, 26, and 28 can be configured to transmit sensor data representative of the sensed parameter to equipment area network coordinator 20. Wireless devices 24, 26, and 28 can be configured to receive commands from equipment area network coordinator 20 and control equipment 22 based upon the received commands. The distance between wireless devices 24, 26, and 28 and equipment area network coordinator 20 is short enough that the data can be transmitted and received using short range and/or low power wireless signals. In one example, wireless devices 24, 26, and 28 are configured to communicate using a time division multiple access scheme. The scheduling of the time division multiple access scheme is dictated by equipment area network coordinator 20. Using a time division multiple access scheme allows wireless devices 24, 26, and 28 to consume less power. In one example, wireless devices 24, 26, and 28 are configured to transmit and receive data using a low power wireless protocol. Low power wireless protocols include BLUETOOTH low-energy, near field communication, etc. Wireless devices 24, 26, and 28 can be powered by batteries, energy harvesters, or wired power. Wireless devices 24, 26, and 28 may be configured to operate on a sleep/wake cycle to conserve power.

Equipment area network 14 is similar to equipment area network 12. Wireless devices 34, 35, 36, and 38 are located proximate to equipment 32. Equipment 32 can be a fuel tank, a wheel assembly, air cycle machine, rotor, or other equipment that is monitored and/or controlled using wireless devices. Wireless devices 34, 35, 36, and 38 can be wireless sensors and/or wireless controllers. Wireless devices 34, 35, 36, and 38 can be configured to sense one or more parameters such as temperature, fuel level, vibration, pressure, or other parameters of equipment 32. Wireless devices 34, 35, 36, and 38 are configured to communicate with equipment area network 20 using a wireless link. Wireless devices 34, 35, 36, and 38 can be configured to transmit sensor data representative of the sensed parameter to equipment area network coordinator 21. Wireless devices 34, 35, 36, and 38 can be configured to receive commands from equipment area network coordinator 21 and control equipment 32 based upon the received commands. The distance between wireless devices 34, 35, 36, and 38 and equipment area network coordinator 21 is short enough that the data can be transmitted and received using short range and/or low power wireless signals. In one example, wireless devices 34, 35, 36, and 38 are configured to communicate using a time division multiple access scheme. The scheduling of the time division multiple access scheme is dictated by equipment area network coordinator 21. Using a time division multiple access scheme allows wireless devices 34, 35, 36, and 38 to consume less power. In one example, wireless devices 34, 35, 36, and 38 are configured to transmit and receive data using a low power wireless protocol. Low power wireless protocols include BLUETOOTH low-energy, near field communication, etc. Wireless devices 34, 35, 36, and 38 can be powered by batteries, energy harvesters, or wired power. Wireless devices 34, 35, 36, and 38 may be configured to operate on a sleep/wake cycle to conserve power. Although equipment area network 12 is shown with three wireless devices and equipment area network 14 is shown with four wireless devices, equipment area networks are not limited to just these configurations. Equipment area networks can comprise any number of sensors needed to monitor equipment. Multi-level wireless network 10, as shown in FIG. 1, includes two equipment area networks. Multi-level wireless networks can include any number of equipment area networks.

Wide area network coordinator 16 is configured to wirelessly communicate with wireless nodes 18 and 19 and equipment area network coordinators 20 and 21. Wireless nodes 18 and 19 can be equipment area network coordinators, wireless devices, or other wireless equipment. Wireless area network coordinator 16 is configured to transmit and receive data using a wireless link with equipment area network coordinators 20 and 21. In one example, wireless area network coordinator 16 is configured to wirelessly communicate over the wireless link using code division multiple access. Wireless area network coordinator 16 may be powered via a wired connection to a power source, including a battery or energy harvester.

Equipment area network coordinators 20 and 21 are configured to transmit and receive data to wireless area network coordinator 16, including data received from wireless devices within their respective equipment area networks. In one example, equipment area network coordinators 20 and 21 are configured to receive data from the wireless devices over a first wireless link using a low power wireless protocol. In a further example, the wireless link uses a time division multiple access scheme. In one example, equipment area network coordinators 20 and 21 are configured to transmit the data received from the wireless devices over a second wireless link using a second wireless protocol. In a further example, the second wireless link uses a code division multiple access scheme. Equipment area network coordinators 20 and 21 are configured to translate the data from one wireless protocol to another when the two wireless links use different wireless protocols. In one example, equipment area networks 12 and 14 use different wireless protocols.

In one example, equipment area network 12 is completely contained within an electromagnetically shielded enclosure. The electromagnetically shielded enclosure substantially attenuates wireless signals between equipment area network 12 and wide area network 11. To facilitate communication between equipment area network coordinator 20 and wireless area network coordinator 16 a first antenna of equipment area network coordinator 20 is located inside of the electromagnetically shielded enclosure. A second antenna of equipment area network coordinator 20 is located outside the electromagnetically shielded enclosure.

Figure 2:
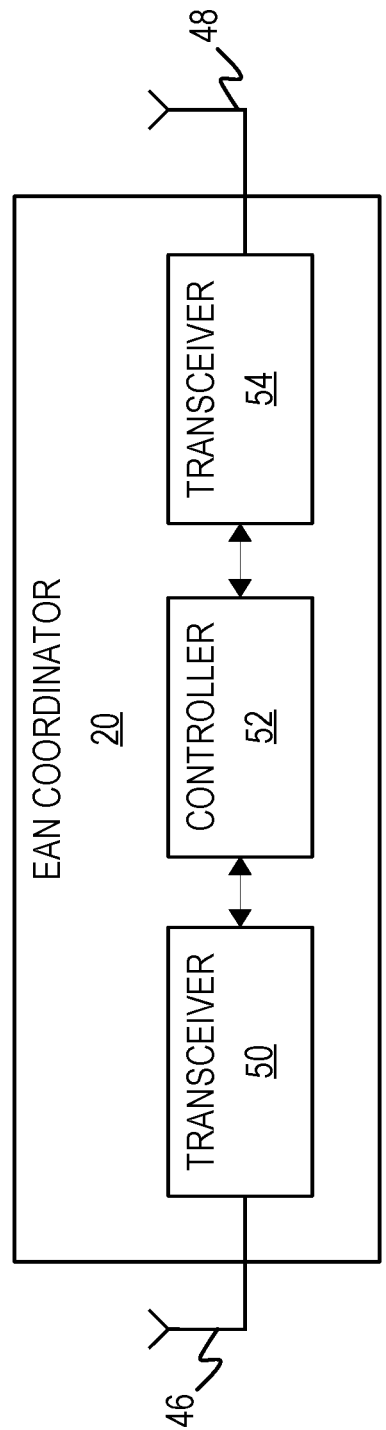
FIG. 2 is a block diagram of an equipment area network coordinator.

FIG. 2 is a block diagram of equipment area network coordinator 20 including antennas 46 and 48, transceiver 50, controller 52, and transceiver 54. Antenna 46 is electrically coupled to transceiver 50. Antenna 48 is electrically coupled to transceiver 54. Controller 52 is electrically and communicatively coupled with transceivers 50 and 54.

Antenna 46 is configured to send wireless signals generated by transceiver 50 to wireless devices of an equipment area network. Antenna 46 is also configured to receive wireless signals from wireless devices of an equipment area network and communicate them to transceiver 50. Antenna 46 is configured to work with low power wireless protocols as is transceiver 50. Antenna 48 is configured to send wireless signals generated by transceiver 54 to a wide area network coordinator. Antenna 48 is also configured to receive wireless signals from a wide area network coordinator. In one example, transceiver 50 and transceiver 54 are configured to operate using different wireless communication protocols. Wireless communication protocols include Wi-Fi, Long-Term Evolution (LTE), BLUETOOTH standard communication, BLUETOOTH low-energy, near field communication, etc. In a further example, transceiver 50 is configured to operate using low power wireless protocols. Low power wireless protocols include BLUETOOTH low-energy, near field communication, etc.

Controller 52 is configured to receive data from transceivers 50 and 54. Controller 52 includes one or more processors and computer-readable memory. Controller 52 is configured to translate data received from one wireless protocol to another, facilitating the use of different wireless protocols by transceivers 50 and 54. In one example, controller 52 is configured to store data received from wireless devices until it has been confirmed that the data has been received from wireless area network coordinator. Controller 52 can determine that the data has been received by receiving a confirmation from the wireless area network coordinator.

Figure 3:
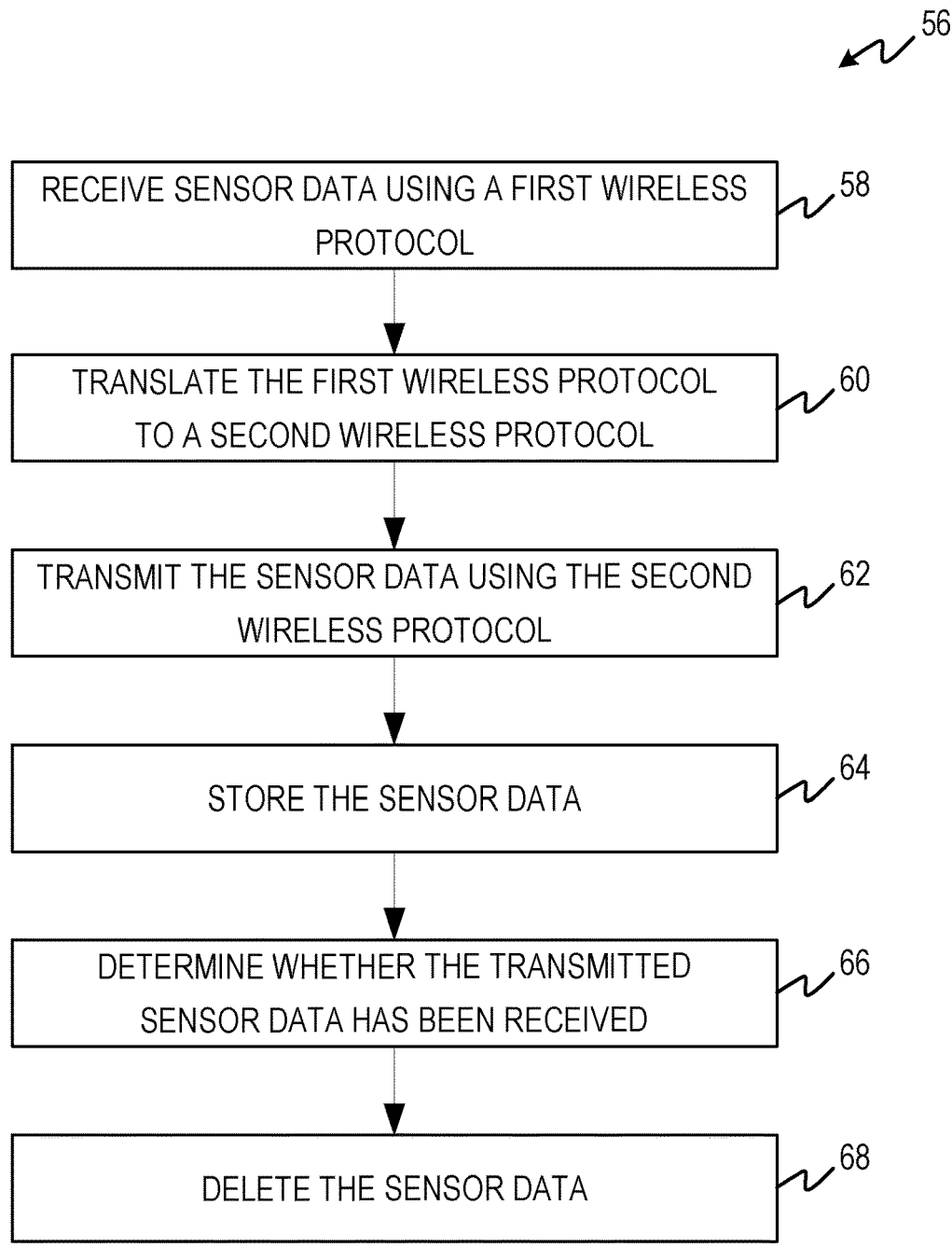
FIG. 3 is a flow diagram depicting a process for relaying data from an equipment area network to a wide area network.

FIG. 3 is a flow diagram depicting process 56 for receiving data from an equipment area network and transmitting the data to a wide area network coordinator. For purposes of clarity and ease of discussion, the example operations are described below within the context of equipment area network coordinator 20 of FIG. 1 and FIG. 2.

At step 58, data is received from at least one wireless device by equipment area network coordinator 20. The data is received from the at least one wireless device using transceiver 50 via a first wireless link using a first wireless protocol. In one example, the first wireless link uses a time division multiple access scheme. The time slot for each wireless device of the equipment area network is determined by equipment area network coordinator 20 and allows wireless devices of the equipment area network to operate on a sleep/wake cycle to conserve battery power. In one example, the first wireless protocol uses a low power wireless protocol. Low power wireless protocols include BLUETOOTH low-energy, near-field communication, etc. At step 60, the data is translated from the first wireless protocol format into the second wireless protocol format using controller 52 in response to receiving the data. In one example, the second wireless protocol is a higher power wireless protocol than the first wireless protocol. The higher power wireless protocol allows wireless transmissions to be stronger and have a greater effective range than a lower power wireless protocol. At step 62, the data is transmitted using transceiver 54 over a second wireless link using the second wireless protocol in response to translating the data from first wireless protocol to the second wireless protocol. In one example, the second wireless link uses code division multiplexing. Code division multiplexing allows multiple equipment area network coordinators to transmit over the same wireless link at the same time.

At step 64, the data is stored in memory of controller 52 in response to receiving the data. At step 66, controller 52 determines whether the transmitted data was received by wide area network coordinator 16 in response to the data being transmitted. Determining whether the data was received can include receiving a confirmation from wide area network coordinator 16. At step 68, controller 52 deletes the data stored in memory. Deleting the data from memory can include overwriting the data or deleting a pointer to the data.

Accordingly, implementing techniques of this disclosure, wireless networks with equipment area networks allow wireless devices to use low power wireless links, which allows for the use of lower cost equipment and increased battery life. Using the equipment area network as described herein, equipment area network coordinators can allow for modular system design of equipment area networks, thereby simplifying design and lowering cost.

Discussion of Possible Embodiments

The following are non-exclusive descriptions of possible embodiments of the present invention.

An equipment area network system of an aircraft can comprise equipment of the aircraft; at least one wireless device proximate to the equipment, the wireless device configured to transmit and receive data over a first wireless link; and at least one equipment area network coordinator communicatively coupled to the at least one wireless device via the first wireless link, the equipment area network coordinator comprising: a first transceiver communicatively coupled to the at least one wireless device, the first transceiver configured to transmit and receive data using the first wireless link; and a second transceiver configured to transmit and receive data outside of the equipment area network using a second wireless link, the first wireless link using lower power than the second wireless link.

The equipment area network system of the preceding paragraph can optionally include, additionally and/or alternatively, any one or more of the following features, configurations and/or additional components:

The first wireless link can use a first wireless protocol and the second wireless link can use a second wireless protocol; and wherein the equipment area network coordinator further includes a controller configured to translate data received using the first wireless link from the first wireless protocol to the second wireless protocol and to translate data received using the second wireless link from the second wireless protocol to the first wireless protocol.

The controller can be further configured to store the sensor data.

The first wireless link can use time division multiplexing.

The equipment area network coordinator can further include a first antenna electrically coupled to the first transceiver and communicatively coupled to the at least one wireless device; and a second antenna electrically coupled to the second transceiver.

The equipment, the at least one wireless device, and the first antenna can be contained within an electromagnetically shielded enclosure.

The wireless device can be a wireless controller configured to control the equipment.

A multi-level network system of an aircraft can comprise at least one equipment area network comprising equipment of the aircraft; at least one wireless device proximate to the equipment, the wireless device configured to transmit and receive data over a first wireless link; and at least one equipment area network coordinator configured to transmit to and receive data from the at least one wireless device using a first wireless link and to transmit and receive data using a second wireless link, the first wireless link using lower power than the second wireless link; and a wide area network that includes a wide area network coordinator configured to transmit and receive data from the at least one equipment area network coordinator using the second wireless link.

The multi-level network system of the preceding paragraph can optionally include, additionally and/or alternatively, any one or more of the following features, configurations and/or additional components:

The at least one equipment area network coordinator can comprise a first transceiver communicatively coupled to the at least one wireless device, the first transceiver configured to transmit and receive data using a first wireless protocol over the first wireless link; a second transceiver configured to transmit and receive data outside of the equipment area network using a second wireless protocol over the second wireless link; and a controller configured to translate data received by the first transceiver from the first wireless protocol to the second wireless protocol and to translate data received by the second transceiver from the second wireless protocol to the first wireless protocol.

The first wireless protocol can be a near field communication protocol.

The first wireless link can use time division multiplexing; and wherein the second wireless link uses code division multiplexing.

The at least one wireless device can be battery powered; and wherein the equipment area network coordinator is powered via a wired connection.

The equipment area network coordinator can further include: a first antenna electrically coupled to the first transceiver and communicatively coupled to the at least one wireless sensor; and a second antenna electrically coupled to the second transceiver; and wherein the equipment, the at least one wireless device, and the first antenna are contained within an electromagnetically shielded enclosure.

The wireless device can be a wireless sensor configured to sense a parameter of the equipment.

A method can comprise receiving, using a first transceiver, data from at least one wireless device of an aircraft, the data received via a first wireless link using a first wireless protocol; translating, using a controller, the data from the first wireless protocol to a second wireless protocol in response to the receiving the data; and transmitting, using a second transceiver, the data over a second wireless link using the second wireless protocol in response to the sensor data being translated from the first wireless protocol to the second wireless protocol, the second wireless link using higher power than the first wireless link.

The method of the preceding paragraph can optionally include, additionally and/or alternatively, any one or more of the following features, configurations and/or additional components:

The method can further include storing the data in a memory of the controller in response to receiving the data; determining whether the transmitted data has been received in response to transmitting the data; and deleting the data stored in memory of the controller in response to determining that the transmitted data has been received.

The first wireless link can use a time division multiple access scheme.

The second wireless link can use a code division multiple access scheme.

The first and second wireless links can use space division multiplexing.

The data can be sensor data.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An equipment area network system of an aircraft comprising:
   equipment of the aircraft;
   at least one wireless device proximate to the equipment, the wireless device configured to monitor the equipment of the aircraft and transmit and receive data over a first wireless link; and
   at least one equipment area network coordinator communicatively coupled to the at least one wireless device via the first wireless link, the equipment area network coordinator comprising:
      a first transceiver communicatively coupled to the at least one wireless device, the first transceiver configured to transmit and receive data using the first wireless link;
      a second transceiver configured to transmit and receive data outside of the equipment area network using a second wireless link, the first wireless link using lower power than the second wireless link;
      a first antenna electrically coupled to the first transceiver and communicatively coupled to the at least one wireless device; and
      a second antenna electrically coupled to the second transceiver,
   wherein the equipment, the at least one wireless device, and the first antenna are contained within an electromagnetically shielded enclosure.

2. The equipment area network system of claim 1, wherein the first wireless link uses a first wireless protocol and the second wireless link uses a second wireless protocol; and
   wherein the equipment area network coordinator further includes a controller configured to translate data received using the first wireless link from the first wireless protocol to the second wireless protocol and to translate data received using the second wireless link from the second wireless protocol to the first wireless protocol.

3. The equipment area network system of claim 2, wherein the controller is further configured to store the sensor data.

4. The equipment area network system of claim 1, wherein the first wireless link uses time division multiplexing.

5. The equipment area network system of claim 2, wherein the wireless device is a wireless controller configured to control the equipment.

6. A multi-level network system of an aircraft comprising:
   at least one equipment area network comprising:
      equipment of the aircraft;
      at least one wireless device proximate to the equipment, the wireless device configured to monitor the equipment of the aircraft and to transmit and receive data over a first wireless link; and
      at least one equipment area network coordinator configured to transmit to and receive data from the at least one wireless device using a first wireless link and to transmit and receive data using a second wireless link, the first wireless link using lower power than the second wireless link, the at least one equipment area network coordinator comprising:
         a first transceiver communicatively coupled to the at least one wireless device with the first transceiver configured to transmit and receive data using a first wireless protocol over the first wireless link;
         a second transceiver configured to transmit and receive data outside of the equipment area network using a second wireless protocol over the second wireless link;
         a first antenna electrically coupled to the first transceiver and communicatively coupled to the at least one wireless device;
         a second antenna electrically coupled to the second transceiver; and
      a wide area network that includes a wide area network coordinator configured to transmit and receive data from the at least one equipment area network coordinator using the second wireless link,
   wherein the equipment, the at least one wireless device, and the first antenna are contained within an electromagnetically shielded enclosure.

7. The multi-level network system of claim 6, wherein the at least one equipment area network coordinator comprises:
   a controller configured to translate data received by the first transceiver from the first wireless protocol to the second wireless protocol and to translate data received by the second transceiver from the second wireless protocol to the first wireless protocol.

8. The multi-level network system of claim 6, wherein the first wireless protocol is a near field communication protocol.

9. The multi-level network system of claim 6, wherein the first wireless link uses time division multiplexing; and
wherein the second wireless link uses code division multiplexing.

10. The multi-level network system of claim 6, wherein the at least one wireless device is battery powered; and
wherein the equipment area network coordinator is powered via a wired connection.

11. The multi-level network system of claim 6, wherein the wireless device is a wireless sensor configured to sense a parameter of the equipment.

12. A method comprising:
receiving, using a first transceiver, data from at least one wireless device of an aircraft, the at least one wireless device configured to monitor equipment of the aircraft, the data received via a first wireless link using a first wireless protocol, the data including information gathered from monitoring the equipment of the aircraft;
translating, using a controller, the data from the first wireless protocol to a second wireless protocol in response to the receiving the data; and
transmitting, using a second transceiver, the data over a second wireless link using the second wireless protocol in response to the sensor data being translated from the first wireless protocol to the second wireless protocol, the second wireless link using higher power than the first wireless link.

13. The method of claim 9, further comprising:
storing the data in a memory of the controller in response to receiving the data;
determining whether the transmitted data has been received in response to transmitting the data; and
deleting the data stored in memory of the controller in response to determining that the transmitted data has been received.

14. The method of claim 9, wherein the first wireless link uses a time division multiple access scheme.

15. The method of claim 9, wherein the second wireless link uses a code division multiple access scheme.

16. The method of claim 9, wherein the first and second wireless links use space division multiplexing.

17. The method of claim 9, wherein the data is sensor data.

* * * * *

UNITED STATES PATENT AND TRADEMARK OFFICE
CERTIFICATE OF CORRECTION

PATENT NO. : 10,333,197 B2
APPLICATION NO. : 15/720918
DATED : June 25, 2019
INVENTOR(S) : Thomas G. Wiegele, Radoslaw Zakrzewski and Michael A. Lynch Page 1 of 1

It is certified that error appears in the above-identified patent and that said Letters Patent is hereby corrected as shown below:

In the Specification

Column 1, Lines 6-16:
Delete "In one example, equipment area network 12 is completely contained within an electromagnetically shielded enclosure. The electromagnetically shielded enclosure substantially attenuates wireless signals between equipment area network 12 and wide area network 11. To facilitate communication between equipment area network coordinator 20 and wireless area network coordinator 16 a first antenna of equipment area network coordinator 20 is located inside of the electromagnetically shielded enclosure. A second antenna of equipment area network coordinator 20 is located outside the electromagnetically shielded enclosure."

Insert -- BACKGROUND
Wireless devices on aircraft are used for monitoring status and health of, and controlling aircraft equipment. In retrofit applications, adding sensors to an aircraft component may allow condition monitoring and predictive maintenance, thus lowering lifecycle costs for operators. Adding wireless controllers to an aircraft component can allow remote control of aircraft components. Often multiple devices need to be added to a single piece of equipment. Adding wired data connections to such devices can be impossible or impractical. However, communicating wirelessly to devices located a large distance away on aircraft may require using higher cost antennas and higher transmit power levels. --

Signed and Sealed this
Tenth Day of September, 2019

Andrei Iancu
*Director of the United States Patent and Trademark Office*